(12) United States Patent
Sato et al.

(10) Patent No.: US 6,694,634 B2
(45) Date of Patent: Feb. 24, 2004

(54) POSITION ERROR EVALUATION METHOD OF MOVING DEVICE AND METHOD OF IMPROVING MOVEMENT ACCURACY BASED ON EVALUATION RESULTS THEREOF

(75) Inventors: Hisayoshi Sato, Tokyo (JP); Kazunori Umeda, Tokyo (JP)

(73) Assignee: Educational Foundation Chuo University, Tokyo (JP)

( * ) Notice: Subject to any disclaimer, the term of this patent is extended or adjusted under 35 U.S.C. 154(b) by 9 days.

(21) Appl. No.: 10/110,740

(22) PCT Filed: Jan. 22, 2001

(86) PCT No.: PCT/JP01/00390
§ 371 (c)(1),
(2), (4) Date: Jul. 29, 2002

(87) PCT Pub. No.: WO02/16868
PCT Pub. Date: Feb. 28, 2002

(65) Prior Publication Data
US 2003/0019119 A1 Jan. 30, 2003

(51) Int. Cl.⁷ .............................................. G01B 5/004
(52) U.S. Cl. .............................. 33/503; 33/533; 33/505
(58) Field of Search ........................... 33/502, 503, 504, 33/505, 533, 551, 552, 553; 73/1.79; 702/150–153, 155, 167, 168

(56) References Cited

U.S. PATENT DOCUMENTS 3,875,667 A * 4/1975 Wilke ........................... 33/533

(List continued on next page.)

FOREIGN PATENT DOCUMENTS

JP    A 5-10751    1/1993

(List continued on next page.)

OTHER PUBLICATIONS

Sato, "Recent Straightness Measurement Method and Development of Sequential Two Points Method", Production Research, vol. 34, No. 6, pp. 25–34, Jun., 1982.

Primary Examiner—Diego Gutierrez
Assistant Examiner—Yaritza Guadalupe
(74) Attorney, Agent, or Firm—Oliff & Berridge, PLC

(57) ABSTRACT

Disclosed is a position error evaluating method of a moving device, which includes the following steps. Specifically, in a moving device which moves a movable body in two axial directions or in three axial directions orthogonal to each other, a straightness error curve indicating a state of change in a position error of the movable body along a uniaxial direction out of predetermined two axial directions is obtained by a sequential two-point method, the position error being related to a direction orthogonal to the predetermined two axial directions out of the biaxial or three axial directions. Then, the above step is repeated for the other uniaxial direction out of the two axial directions. Subsequently, straightness error curves indicating a state of change in a position error of the movable body along the other uniaxial direction is obtained based on coordinate positions of both ends of a group of already obtained straightness error curves, the position error being related to the direction orthogonal to the predetermined two axial directions. The straightness error curves at the coordinate positions of the both ends are set as a boundary straightness error curve. Thereafter, based on the boundary straightness error curves, alignment of the group of straightness error curves is corrected, thereby obtaining an error surface. Lastly, in accordance with the error surface, a two-dimensional position error of the movable body on a planar surface including the predetermined two axes is evaluated, the two-dimensional position error being related to a direction orthogonal to the planar surface. According to this method, in evaluating the position error of the moving device, compared to the conventional method, adjustment takes less time, and automatic evaluation can be easily performed. Thus, accuracy of a measuring device can be easily maintained.

7 Claims, 17 Drawing Sheets

U.S. PATENT DOCUMENTS

| | | | | |
|---|---|---|---|---|
| 4,939,678 | A | * | 7/1990 | Beckwith, Jr. ............... 702/95 |
| 4,945,501 | A | * | 7/1990 | Bell et al. ..................... 702/95 |
| 5,687,487 | A | * | 11/1997 | Johnson ................... 33/501.02 |
| 6,401,349 | B1 | * | 6/2002 | Onyon ........................ 33/551 |
| 6,487,787 | B1 | * | 12/2002 | Nahum et al. ................ 33/706 |
| 6,513,253 | B2 | * | 2/2003 | Matsuda et al. .............. 33/502 |
| 6,546,640 | B2 | * | 4/2003 | Okada et al. ................. 33/503 |
| 6,601,311 | B2 | * | 8/2003 | McMurtry et al. ............ 33/502 |
| 2001/0045021 | A1 | * | 11/2001 | Matsuda et al. .............. 33/502 |

FOREIGN PATENT DOCUMENTS

| | | | |
|---|---|---|---|
| JP | A 10-9852 | | 1/1998 |
| JP | 02-59340 | * | 2/2002 |

\* cited by examiner

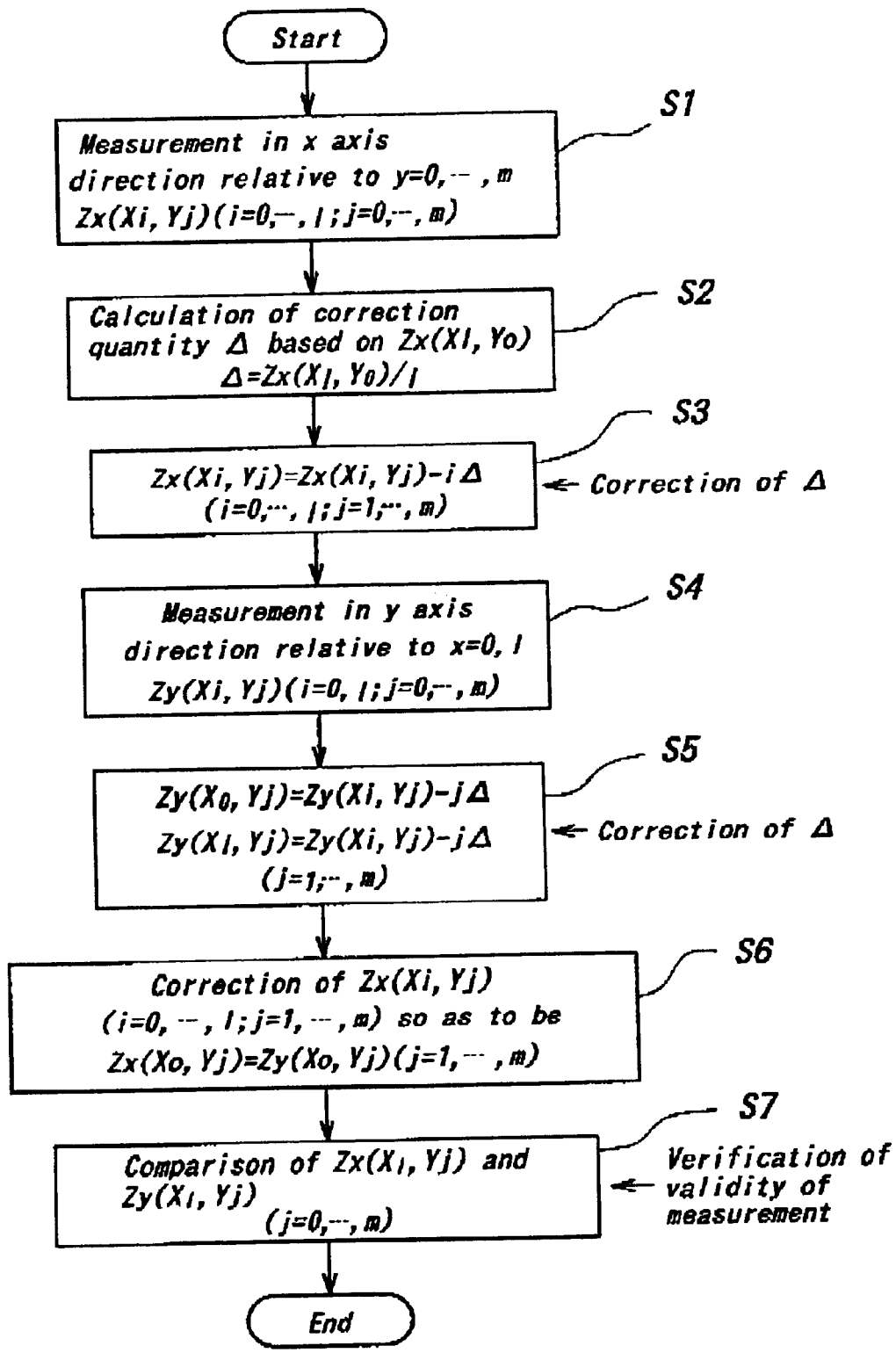

■ Measuring point

● Point where error is wished to be identified

■ Measuring point

● Point where error is wished to be identified

Ball plate
Ball beam
(length standard)

POSITION ERROR EVALUATION METHOD OF MOVING DEVICE AND METHOD OF IMPROVING MOVEMENT ACCURACY BASED ON EVALUATION RESULTS THEREOF

TECHNICAL FIELD

The present invention relates to a method of evaluating a position error of a movable body such as a gauge head or a tool, and to a method of improving position accuracy by use of the evaluation method, which are used in a three-dimensional coordinate measuring device for moving the gauge head in three axial directions orthogonal to each other or in a moving device such as a machine tool for moving the tool in biaxial or three axial directions orthogonal to each other.

BACKGROUND ART

With the advancement of automated and high-accuracy machinery processing, the three-dimensional coordinate measuring device is obliged to have a function of evaluating dimensional accuracy and form accuracy, which is indispensable in a production line and a production system. Meanwhile, increasing of measurement accuracy more than the present level by the three-dimensional coordinate measuring device as hardware incurs a result of raising manufacturing expenses besides the accompanying difficulty in a manufacturing technology. Thus, in recent years, improvement in the measurement accuracy which is a basic performance as a device has been attempted by grasping precision of the device in shipment thereof and by correcting movement of the gauge head.

However, the conventional correction of the movement of the gauge head is the one in which cumulative errors determined when the gauge head is sent for a certain interval are obtained, and then the errors are allocated in proportion to the interval. Thus, the conventional correction is not intended to perform the correction by grasping movement errors of the gauge head within the interval. The above-described is symbolized by the fact described as follows. That is, in the present situation, the evaluation method itself of the movement errors is in the stage of evaluating and comparing the errors of the measuring device in such a manner that a ball plate as shown in FIG. 12, which is an accuracy standard and is taken around by the world's leading organizations, is measured as shown in FIG. 13 by three-dimensional coordinate measuring devices possessed by the world's leading organizations for searching for a standard method.

Incidentally, the ball plate is very expensive and has a considerable weight. Thus, handling thereof has not been easy. In addition, in tests by taking around the ball plate, the result thereof has not reached the point of obtaining a result as systematic as error characteristics of the three-dimensional coordinate measuring device can be stipulated. Note that FIGS. 14(a) and 14(b) are examples of displaying results of error measurement by the ball plate. FIG. 14(a) shows directions and sizes of errors by use of bars; FIG. 14(b) shows errors within a measured plane by deformation of meshes. In order to obtain position errors in three axial directions of the gauge head by locating the ball plate at a specified position in a space, it is necessary to repeat adjustment of highly accurate positioning of the ball plate of which handling is hardly easy. The above can be hardly achieved in reality, and it is extremely difficult to obtain an error space by the foregoing.

Although space errors are not obtained, as a standard error calibration method available for practical use, enumerated are: a method by use of a step gauge using standard blocks as shown in FIG. 15; a method by use of a normal block gauge; a method by use of a test bar as shown in FIG. 16; a method by use of an autocollimator as shown in FIG. 17; and a method by use of a laser measuring device as shown in FIG. 18. However, in conventional methods such as the above-described method by use of the test bar, method by use of the autocollimator, laser measuring device, ball plate, and step gauge using the standard blocks, respectively, or a reverse method as shown in FIGS. 19(a) and 19(b), there are problems that adjustment thereof takes long time, automatic evaluation is hard to perform, and the accuracy of the measuring devices is hard to maintain.

Meanwhile, considering the case of machine tool, besides the autocollimator and a straight ruler, the laser measuring device is used for evaluating movement accuracy of a tip of a tool. However, in reality, it is hard to obtain the error space by using the above because of the following reasons and the like. Specifically, disposition and adjustment of the devices require time, the devices are not for use in evaluation of tool movement even though they are suitable for evaluating accuracy of work pieces, and the devices require too much work and time in identifying errors in three axial directions of a predetermined position in a space.

The various methods which have been heretofore used are the ones in which due consideration is given in terms of evaluating accuracy. However, from the view point of operability, productivity, price or the like concerning measurement, the above devices are not necessarily proper to be used for various purposes or to be standard devices. Therefore, it was actually hard to achieve improvement in accuracy of the device by correcting movement of the gauge head in such a manner that the error space is evaluated by the conventional method and set as a fundamental error characteristic to be an object of the correction, and a function of hardware is secured in a certain level.

Incidentally, the inventors of the present application have proposed a method of measuring a straightness error by use of a sequential two-point method in the article "Trend of Straightness Measuring Method and Development of Sequential Two-Point Method" which was previously presented in the pages 25 to 34 of "Production Research" Vol. 34, No. 6, published in June of 1982 by Institute of industrial Science, University of Tokyo. The sequential two-point method is the one for obtaining a straightness error of movement of a tool stage and a straightness error of a surface of an object to be measured simultaneously and independently of each other. Specifically, the sequential two-point method is carried out in the following manner: two displacement sensors disposed with a space therebetween on the tool stage are moved in a direction of the space at a pitch equal to the space, and simultaneously, a displaced quantity of each displacement sensor with respect to the surface of the object to be measured is measured, and thus the above straightness errors are obtained from data rows of the displaced quantities of the two displacement sensors. The inventors of the present application have achieved the points that, by application of the sequential two-point method to evaluation of errors as described above, the adjustment takes less time, the automatic evaluation can be performed easily, and the accuracy of the measuring device is easily maintained, compared to the conventional methods such as the method by use of the test bar, the methods by use of the autocollimator, laser measuring device, ball plate, and step gauge using the standard blocks or the reverse method as shown in FIGS. 19(a) and 19(b).

DISCLOSURE OF INVENTION

The present invention is intended to provide an error measuring method which has solved the problem of the conventional method advantageously in consideration for characteristics of the above-described sequential two-point method. A position error evaluating method of a moving device according to the present invention is characterized by including the following steps. Specifically, according to a method specified in claim 1, in a moving device which moves a movable body in two axial directions or in three axial directions orthogonal to each other, obtaining by the sequential two-point method a straightness error curve indicating a state of change in a position error of the movable body along a uniaxial direction out of predetermined two axial directions is repeated for the other uniaxial direction out of the predetermined two axial directions, the position error being related to a direction orthogonal to the predetermined two axial directions out of the biaxial or three axial directions. Subsequently, straightness error curves indicating a state of change in a position error of the movable body along the other uniaxial direction are obtained based on coordinate positions of both ends of a group of already obtained straightness error curves, the position error being related to the direction orthogonal to the predetermined two axial directions. The straightness error curves at the coordinate positions of the both ends are set as boundary straightness error curves. Thereafter, based on the boundary straightness error curves, alignment of the group of straightness error curves is corrected, thereby obtaining an error surface. Lastly, in accordance with the error surface, a two-dimensional position error of the movable body on a planar surface including the predetermined two axes is evaluated, the two-dimensional position error being related to a direction orthogonal to the planar surface.

According to the position error evaluating method of the moving device of the present invention, for error evaluation of a three-dimensional coordinate measuring device and a device with a similar structure thereto of measuring a semiconductor substrate, a glass substrate for a liquid crystal display device and the like, straightness error curves and a planar error surface of movement of a gauge head can be measured. In addition, besides the above, the sequential two-point method has a characteristic of being capable of simultaneously measuring an error shape of a substrate to be measured and the like. According to the method of the present invention, with regards to the moving device other than the measuring device, such as a machine tool, the straightness error curve and planar error surface can be measured for the error evaluation of the movement of the movable body such as a tool stage.

Note that, according to the position error evaluating method of the moving device of the present invention, as specified in claim 2, an error space may be obtained in such a manner that obtaining the error surface by the method specified in claim 1 with respect to the uniaxial direction orthogonal to the planar surface including the predetermined two axes is repeated within predetermined coordinate ranges in each of the three axial directions. Accordingly, a three-dimensional position error of the movable body in a space within the predetermined coordinate range may be evaluated according to the error space.

According to the position error evaluating method of the moving device of the present invention, while taking as the basics a straight movement error curve of the gauge head as the movable body, the error space is obtained by the sequential two-point method as described above. Thus, a performance related to a measurement error can be evaluated more in detail. Identification of the error space with the straightness error curve obtained by the sequential two-point method as the basics according to the method of the present invention is excellent in the following points. Specifically, the identification of the error space is comprehensive as the space, adjustment of instruments and the like for implementing measurement takes less time, and systematic errors corresponding to coordinate axes can be obtained.

Moreover, according to the position error evaluating method of the moving device of the present invention, as specified in claim 3, at an intermediate point of the points where the position error has been obtained by the sequential two-point method, a position error may be obtained by one-dimensional or multidimensional interpolation based on characteristics of the position error.

In the above-described manner, at the intermediate point of the points where the position error has been obtained by the sequential two-point method, the position error is obtained by the interpolation. Thus, even if the points where the position error is obtained by the sequential two-point method are spaced to some extent, the position error can be obtained at the point between those points. Therefore, the speed of the measurement by the sequential two-point method can be increased, and the straightness error curve and the error surface can be obtained in a shorter period of time.

A method of improving three-dimensional position accuracy of a moving device of the present invention according to claim 4 is characterized by including the steps of: maintaining data in a control device for controlling an operation of the moving device, the data indicating the error space obtained by the method specified in claim 2 or 3; and, by use of a relational expression of correction for compensating for an error in the above error space data correcting a position of the movable body moved by the moving device.

According to the method of improving three-dimensional position accuracy of a moving device of the present invention, the data indicating the error space obtained by the sequential two-point method as described above is maintained in the control device, and a motion, based on the data maintained in the control device, of correcting the error by use of the relational expression of correction for compensating for the error in the error space data is given to the moving device by, for example, a CNC (computer numeric control) function of the control device. Accordingly, improvement in measurement accuracy and movement accuracy of a tool, which are actual functions of the device, can be achieved. As a result, in the state of reaching the stage where price rise is inevitable in the case of improving accuracy by the hardware configuration of the device, improvement in the device performance can be expected while restraining the price rise.

For a semiconductor substrate, a glass substrate for a large-sized image display device, and the like, accuracy evaluation in a planar shape of nm order is required. For the above accuracy evaluation, considered is the employment of a three-dimensional coordinate measuring device of a normal rectangular coordinate system using a machine platen as a table or of a three-dimensional coordinate measuring device of a polar coordinate system which rotates a table. In the above devices, maximum accuracy is upgraded by hardware modification, thereby aiming for achievement of required measurement accuracy and resolution. Therefore, by introducing the sequential two-point measuring method to the above devices and by applying the method of the present invention thereto, a function of further higher accuracy can be offered to the measuring device derived from the idea of the conventional method. Accordingly, contribution can be made to improvement of processing accuracy in a production technology.

Note that, when the position error evaluating method of the present invention is applied to the three-dimensional coordinate measuring device of the polar coordinate system, instead of three axes orthogonal to each other, two axes orthogonal to each other and a rotation angle around one axis out of the two axes may be used. In the above case, position error data measured by moving a displacement sensor along an orthogonal coordinate system may be converted to the polar coordinate system. Meanwhile, the position error data may be directly obtained by moving the displacement sensor radially and circumferentially along the polar coordinate system.

Furthermore, in the method of improving three-dimensional position accuracy of the moving device of the present invention, as specified in claim 5, a position of the movable body moved by the moving device may be corrected upon using the moving device by previously obtaining the error space data according to a change of environment surrounding the moving device and by using a relational expression of correction for compensating for an error in the error space data corresponding to environment surrounding the moving device in use.

A matrix structure of the error space is assumed to be changed in some cases by surrounding environment, use conditions and the like. In regard to the above, because the error space can be automatically and easily obtained by the sequential two-point method compared to the conventional method, easy correction can be executed by imparting a matrix structuring an error space to the changes of the above conditions.

Specifically, as specified in claim 5, the error space data is previously obtained and stored, the error space data being relative to the surrounding environment, typically the ambient temperature of the device, temperature rise in a representative point of the structure due to intensive and repeated use, and the like. Thus, by monitoring the environment in a real environment, correction for each error space can be performed. Accordingly, against the change in the surrounding environment of the measuring device or the machine tool, measurement accuracy and movement accuracy of a tool can be maintained.

BRIEF DESCRIPTION OF THE DRAWINGS

FIG. 1 is a flowchart showing processing for constituting an error surface from a group of error curves in an example of a method of evaluating a position error of a moving device according to the present invention.

BEST MODE FOR CARRYING OUT THE INVENTION

Figure 2A:
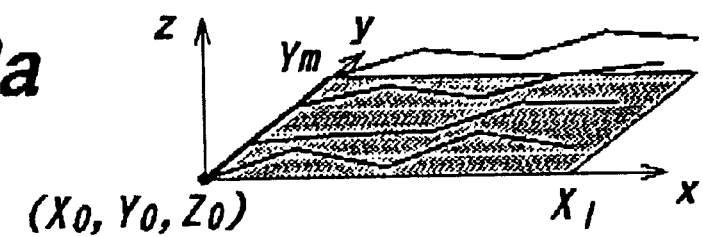
FIGS. 2(a) to 2(g) are explanatory views showing contents of the processing of the flowchart.
Figure 2B:
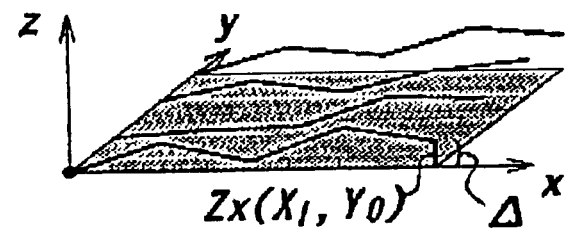

Hereinbelow, an embodiment of the present invention will be described in detail based on an example with reference to the drawings. Here, FIG. 1 is a flowchart showing a processing flow in a position error evaluating method of a three-dimensional coordinate measuring device as the example of a position error evaluating method of a moving device according to the present invention. FIGS. 2(a) to 2(g) are explanatory views showing the processing shown in FIG. 1. FIG. 3 is a perspective view showing an example of the three-dimensional coordinate measuring device to which the above-described example is applied.

Figure 3:
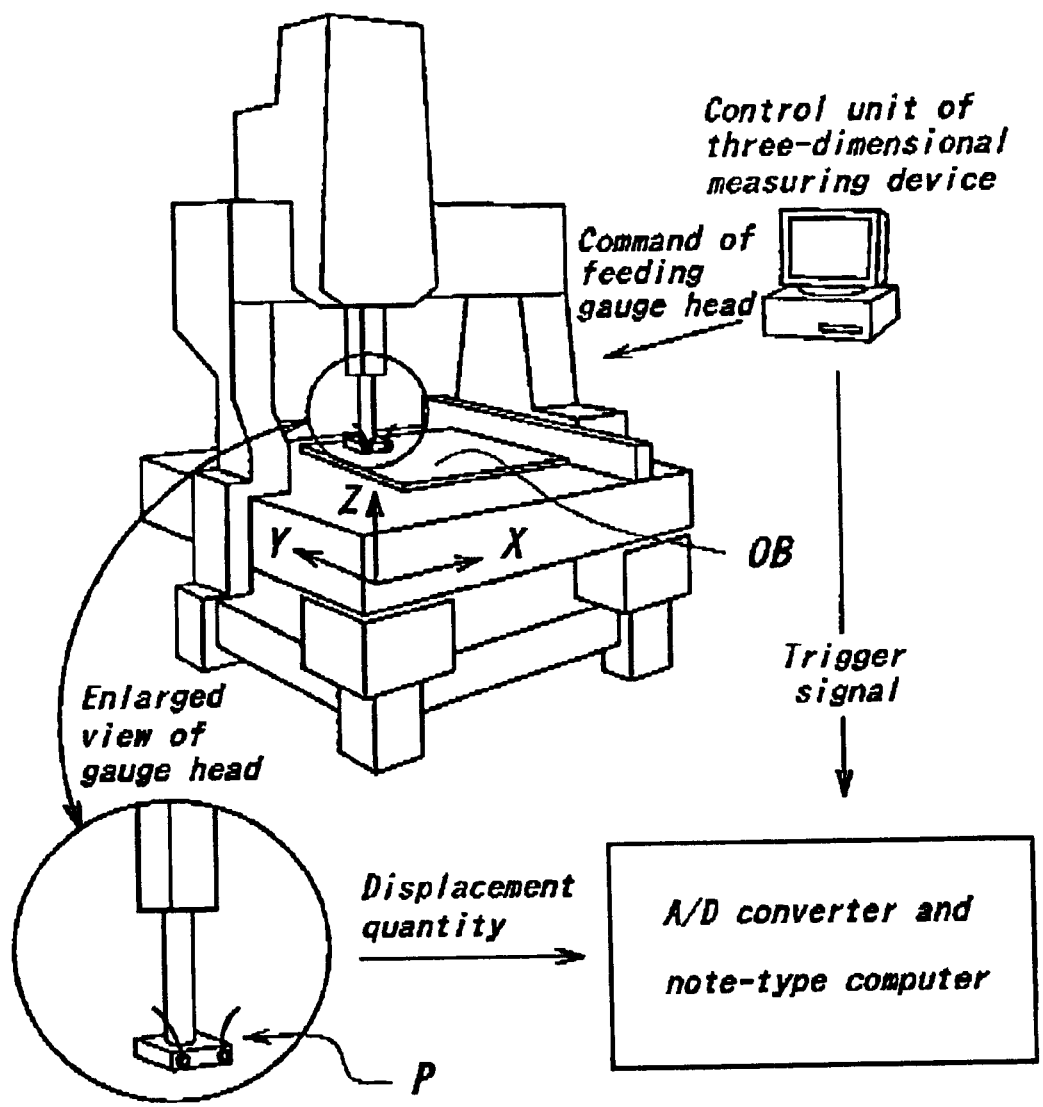
FIG. 3 is a perspective view exemplifying a three-dimensional coordinate measuring device used for implementation of the method of the example.
Figure 4:
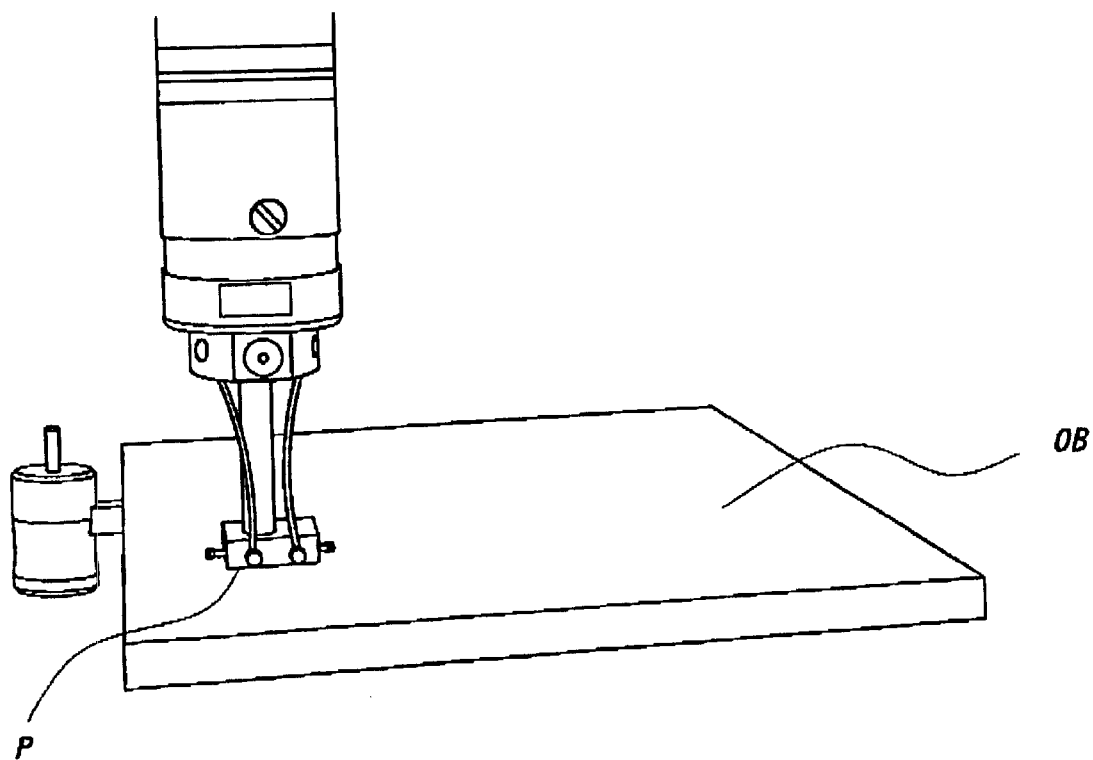
FIG. 4 is an explanatory view showing a state of measurement by the three-dimensional coordinate measuring device.
Figure 5:
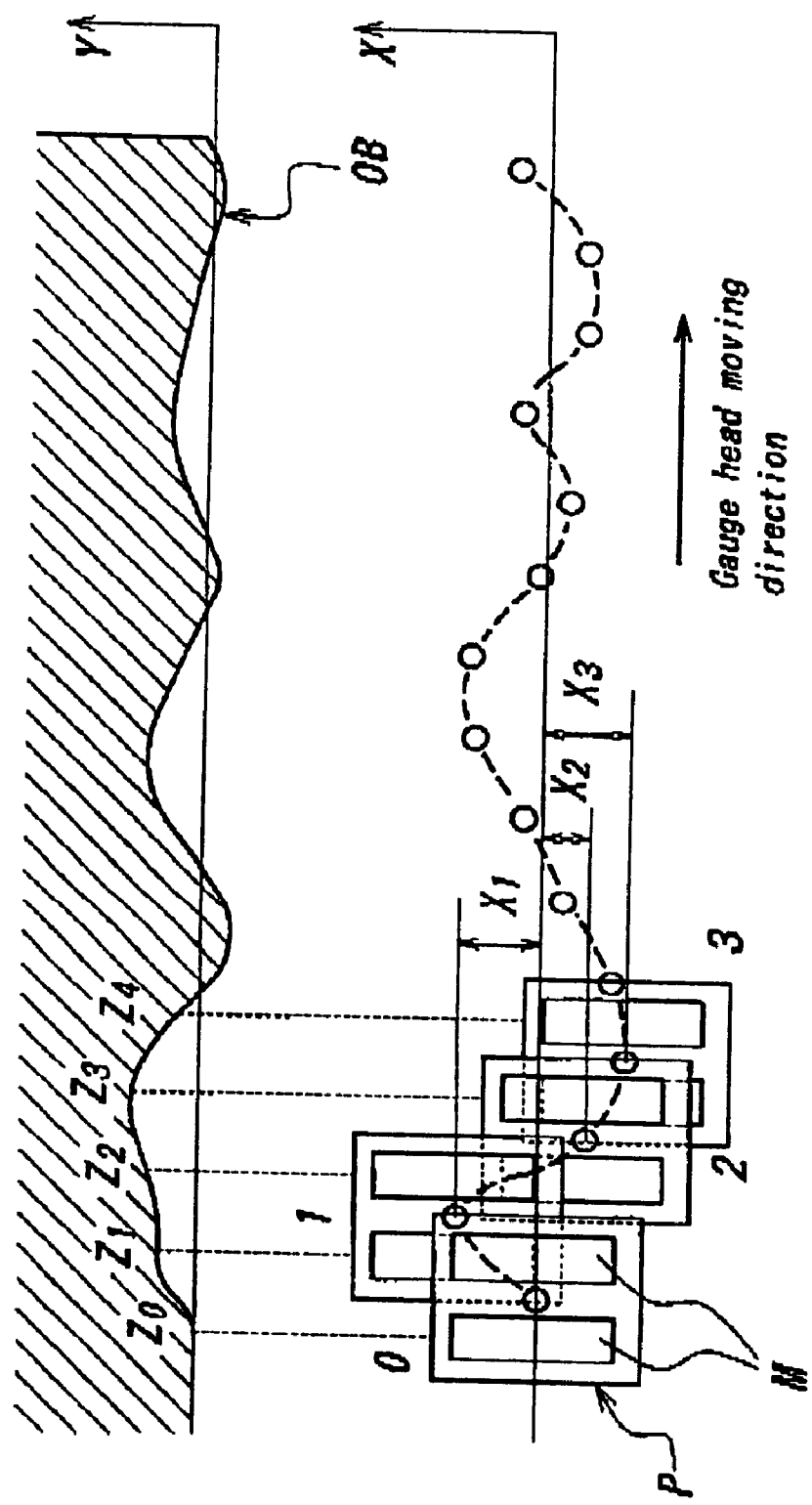
FIG. 5 is a schematic view showing a measurement principle of a sequential two-point method carried out by the method of the example.

In the method of the example, a coordinate space with three axial directions of X, Y and Z are first set for the three-dimensional coordinate measuring device as shown in FIG. 3, where an extending direction of a gate-shaped frame is set as the X axis as shown in the drawing. Here, instead of a probe, a gauge head P is installed in the foregoing three-dimensional coordinate measuring device, as shown in FIG. 4, for the purpose of error measurement by a sequential two-point method. The gauge head P has two laser non-contact displacement sensors installed on its tip. An ordinary computer is placed for calculating an error space by performing the sequential two-point method. Through an analog/digital converter, output signals of the foregoing two displacement sensors are inputted to the computer. Then, those two-displacement sensors are allowed to face an object plate OB flattened as much as possible. Subsequently, measurement is repeated while moving the gauge head P in a direction of a space made between the two displacement sensors at a pitch equal to the space therebetween. FIG. 5 is a schematic view showing a principle of the above measurement, in which M denotes the displacement sensors.

Note that the type of the displacement sensor used in the sequential two-point method is not limited to the above-described. In addition, reference should be made to the above-described "Trend of Straightness Measuring Method and Development of Sequential Two-Point Method" for details of the sequential two-point method itself.

Next, a planar surface constituted by $(X_i, Y_j, Z_k)$ is conceived with respect to (X, Y, Z) system which is an orthogonal coordinate system having the axes of X, Y and Z shown in FIG. 3. Here, i, j and k are set as follows: i=0, 1, . . . l; j=0, 1, . . . m; k=0, 1, . . . n. When $(X_i, Y_0, Z_0)$ is taken, and the sequential two-point method is applied along the X axis, a straightness error curve along the X axis of the gauge head is obtained in the following manner.

The two displacement sensors on the gauge head are set to A and B; the straightness errors of the gauge head and the surface of the object plate, X and Z; and values measured by the displacement sensors, D. Then, $X_k$ and $Z_k$ are obtained by simple relationships thereamong shown in the following. In this event, it is assumed that yaw motion which is rotation of the gauge head is not present when the gauge head is in motion.

$$X_k = X_{k-1} - D_{kA} + D_{(k-1)B} \quad (1)$$

$$Z_k = X_k + D_{kA} - D_{0A} \quad (2)$$

$$X_0 = 0, X_1 = 0, Y_0 = 0 \quad (3)$$

When the above-described process is repeated for $(X_i, Y_j, Z_0)$, that is, for $Y_j$ where j is an integer, a group of the straightness error curves obtained in the X axis direction can be obtained relative to a plane of Z=0.

Figure 6:
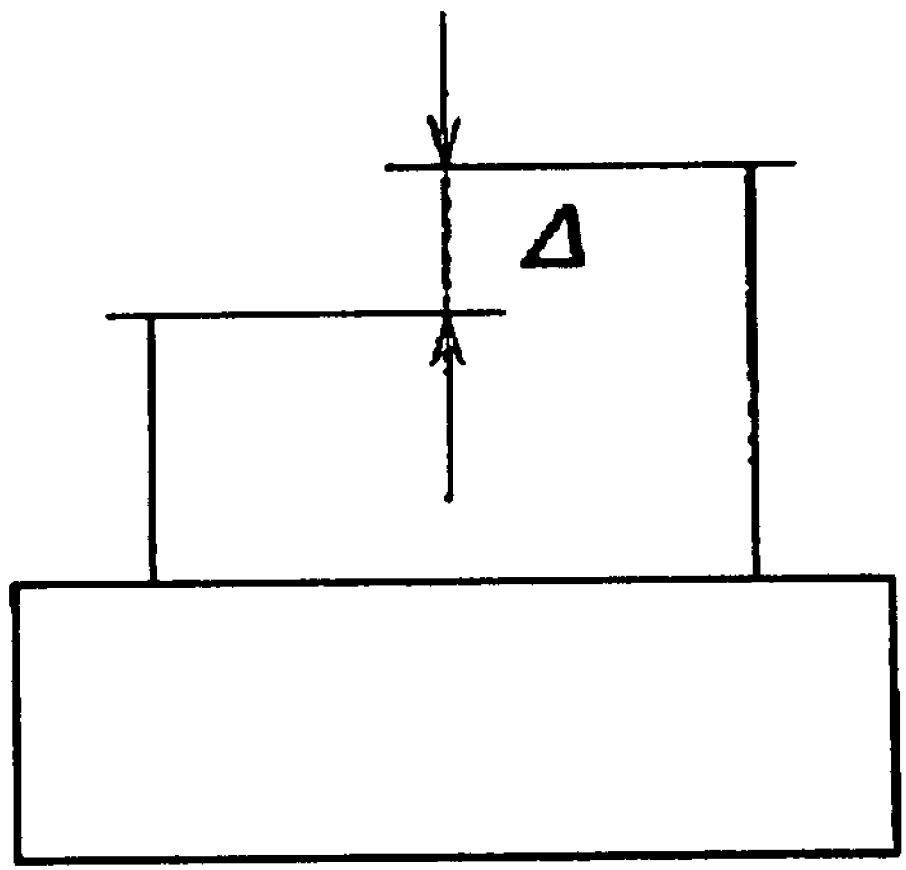
FIG. 6 is an explanatory view showing irregularity of displacement sensors of a gauge head according to the method of the example.

Based on the fundamental theory, the tips of the two displacement sensors are aligned with each other. However, practically, there always remains slight irregularity Δ (see FIG. 6). In the straightness error curve measured, 1 Δ is accumulated in the last stage of the measurement where the number of times of sending two points is set as 1, thus being obtained in a superposed manner. Therefore, in the straightness error curve of the gauge head movement with respect to $Y_0$, by correcting the irregularity, the error curve can be given by setting an error $\delta_z$ to 0 at both ends of a measurement range on the X axis. Meanwhile, regarding a straightness error curve relative to $X_i$ obtained with respect to $Y_j$, where j=1, . . . m, even when correction is made for the end thereof by 1 Δ while setting the beginning thereof to 0, $\delta_z \neq 0$ is established, and thus $\delta_z (Y_{jm})$ resultantly remains.

As means for constituting a planar error surface based on the above-described group of straightness error curves, a straightness error curve in the Y axis direction is obtained by setting j=0, 1, . . . m in $(X_0, Y_j, Z_0)$ and $(X_1, Y_j, Z_0)$. Specifically, at each of the beginning and end of the group of straightness error curves in the X axis direction, a straightness error curve in a direction orthogonal to those curves is obtained. In this event, the two displacement sensors used in obtaining the error curves in the X axis direction are directly used by being rotated around a vertical axis line. Thus, the tip irregularity Δ is retained and can be immediately considered in evaluation of the straightness error curve in the Y axis direction. In the case of measuring the foregoing with two displacement sensors originally disposed in the Y axis direction, the same method as that used in evaluating the tip irregularity considered in the X axis direction is separately used. Accordingly, the straightness error curve in the Y axis direction can be obtained. However, considering that evaluation of $\delta_z$ was enabled in the last stage of the respective straightness error curves, it is effective for maintaining measurement accuracy and operation efficiency to directly use the displacement sensors used in measurement in the X axis direction by rotating the same as described above.

The group of straightness error curves obtained in the X axis direction is superposed at relevant positions of the straightness error curve in the Y axis direction, which is obtained in the beginning and end of each curve obtained in the X axis direction. Thus, the planar error surface can be constituted by combining the group of straightness error curves obtained in the X axis direction, which are obtained mutually independently, as a factor.

The above-described processing of constituting the error surface based on the group of error curves can be executed in accordance with procedure shown in the flowchart of FIG. 1. FIGS. 2(a) to 2(g) show charts in respective steps of the procedure. In other words, according to the procedure shown in FIG. 1, in Step S1, the straightness error curves in the X axis direction are first obtained relative to respective values of y=0, . . . , m as shown in FIG. 2(a). Subsequently, in Step S2, as shown in FIG. 2(b), a correction quantity Δ is calculated based on an error obtained when x=1 and y=0.

Figure 2C:
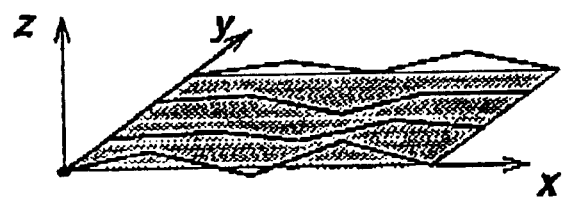
Figure 2D:
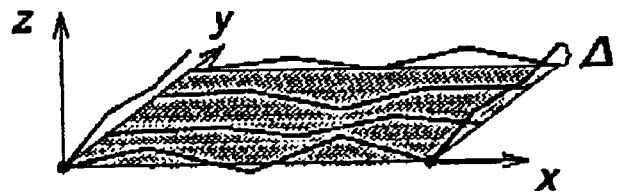

Subsequently, in Step S3, as shown in FIG. 2(c), each straightness error curve in the X axis direction is corrected by the foregoing correction quantity Δ. In Step S4 subsequent thereto, as shown in FIG. 2(d), the straightness error curves in the Y axis direction are obtained for the respective values of x=0 and x=1.

Figure 2E:
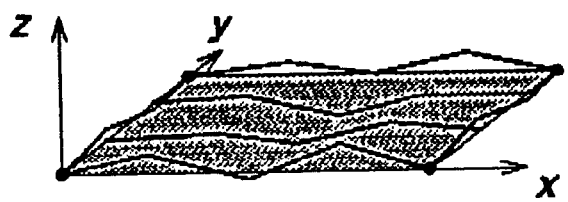
Figure 2F:
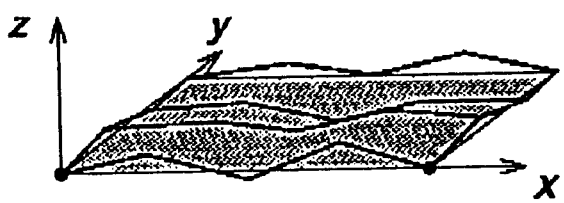

Subsequently, in Step S5, as shown in FIG. 2(e), each straightness error curve in the Y axis direction is corrected by the foregoing correction quantity Δ. In Step S6 subsequent thereto, as shown in FIG. 2(f), the respective straightness error curves in the X axis direction are corrected in such a manner that the both ends thereof are positioned on the respective straightness error curves in the Y axis direction which are obtained for the respective values of x=0 and x=1.

Figure 2G:
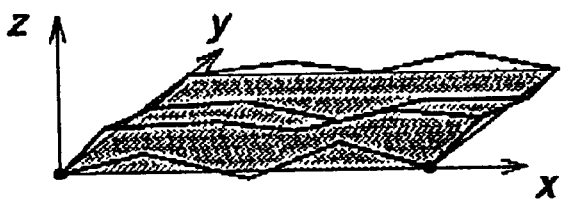
Figure 7:
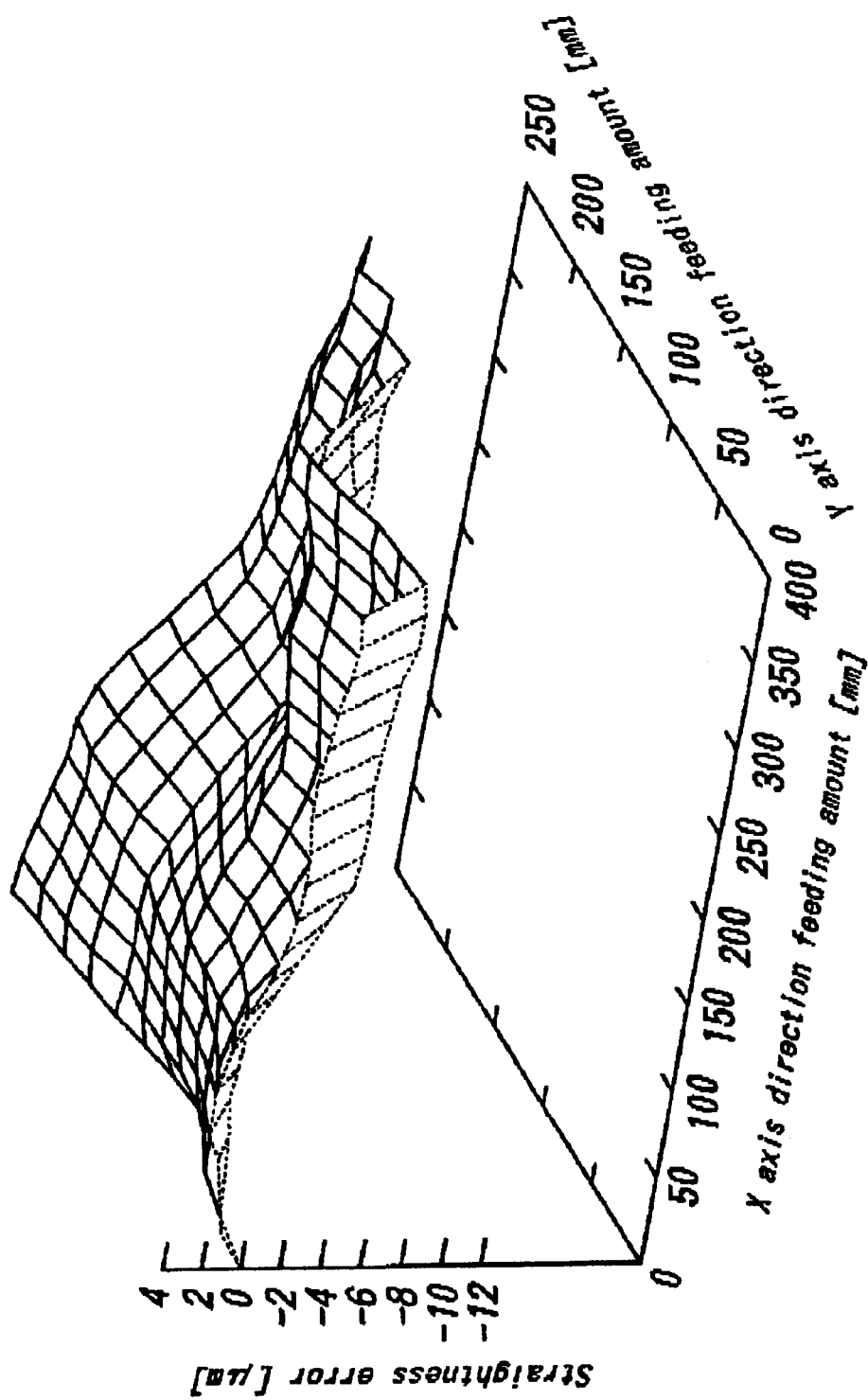
FIG. 7 is an example of an error surface obtained by the method of the example.

In the last Step S7, as shown in FIG. 2(g), the straightness errors in the X axis direction and Y axis direction are compared with each other when x=1. This step of examining validity of measurement by the comparison is for performing remeasurement in the case where the errors compared are excessive when checked whether or not the errors are the ones of about the normal accuracy of the three-dimensional coordinate measuring device. FIG. 7 is an example of measurement of an error surface obtained by the above-described processing.

The above-described method is repeated, and a group of planar error surfaces are obtained so as to offer error components in the X, Y and Z axes directions at required coordinate positions. Thus, the error space of the three-dimensional coordinate measuring device can be obtained. The error space can be defined by a matrix taking the error components related to the respective coordinate positions as element components.

Therefore, according to the method of improving three-dimensional position accuracy of the present invention, relational expressions of correction are constructed from the foregoing matrix, in which the error components at the respective coordinate positions are set to zero. Based on the above expressions, the probe is moved so as to compensate for the quantity of the foregoing errors under the command of a CNC function of the three-dimensional coordinate measuring device. Accordingly, a highly accurate measurement function of the three-dimensional coordinate measuring device can be achieved.

In addition, the foregoing method can be applied to any moving devices such as a machine tool, besides the three-dimensional coordinate measuring device. Thus, a movable body highly accurate in movement thereof can be achieved.

Incidentally, the foregoing error space is conceived to be influenced by the environment in which the moving device of the three-dimensional coordinate measuring device and the like is disposed or by the change of state of the device with the passage of time.

Usually, the environment in which the highly accurate moving device of the three-dimensional coordinate measuring device and the like is placed is adjusted at a constant temperature. However, it is conceivable that the device is used under the conditions with an unsatisfying temperature. In such a case, the moving device is affected by the environmental temperature. Moreover, there is a possibility that the moving device is partially heated by a continuous operation thereof. Furthermore, there is also a possibility that the error space is changed by abrasion, microdeformation or the like in long-term use of the moving device.

With respect to such a change in the error space, the accuracy of the device can be maintained in the following manner. Specifically, mutual relationships of the environment and the state of the device between the time of measuring the error space and the time of actually using the device are clarified. Then, the relational expressions of correction are previously obtained by measuring the error space in accordance with the changes in the environment and state of the device. Accordingly, the relational expressions of correction are modified according to the environment and state of the device at the time of actually using the device.

In addition, regarding to intermediate positions which are between measuring positions, estimation thereof can be carried out by means of straight line, curve or surface interpolation based on errors at the measuring positions.

In other words, measuring points of which errors can be obtained by the sequential two-point method are discrete. However, a correction quantity at a given measuring point can be calculated by use of the interpolation method as described below.

Figure 8:
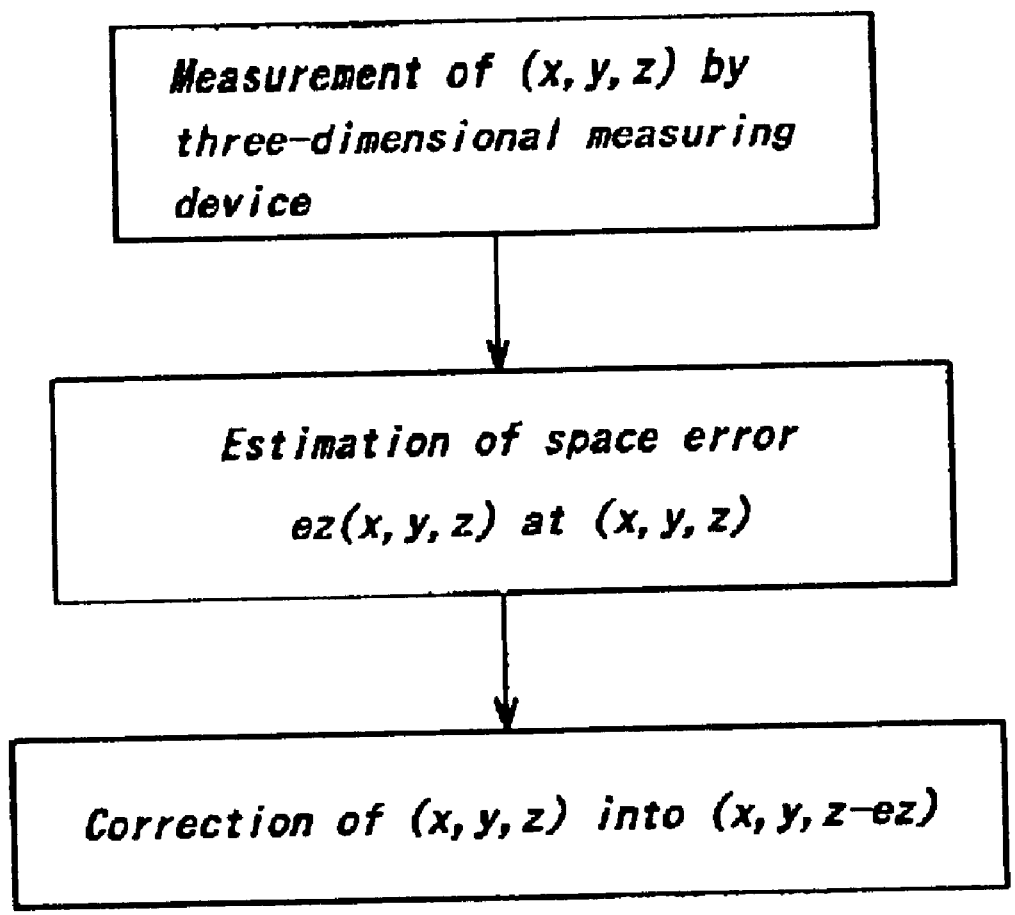
FIG. 8 is a flowchart showing a correction procedure for obtaining errors at a given position in an error space according to the method of the example.

A point where an error is obtained is set to $(x_i, y_i, z_i)$, and an error of z component at that point is set to $e_z(i, i, i)$. Note that exactly the same process as the above is also followed regarding x component and y component. In this event, an error $e_z$ at a certain measuring point $(x, y, z)$ is estimated, and then $e_z$ is subtracted from a measurement result, thereby enabling correction of a space error. Such correction of the space error follows the flow as shown in FIG. 8.

Note that, strictly, an error at a point $(x, y, z-, e_z)$ must be obtained. However, since $e_z$ is sufficiently small, no problem arises as long as the error at the point $(x, y, z)$ is estimated as described above.

As a principal method for estimating the error $e_z$, the following three methods are conceivable.

(1) Linear interpolation (bilinear interpolation)
(2) Higher-order interpolation
(3) Least square method The above three methods will be sequentially explained.

(1) Linear Interpolation (Bilinear Interpolation)

Figure 9:
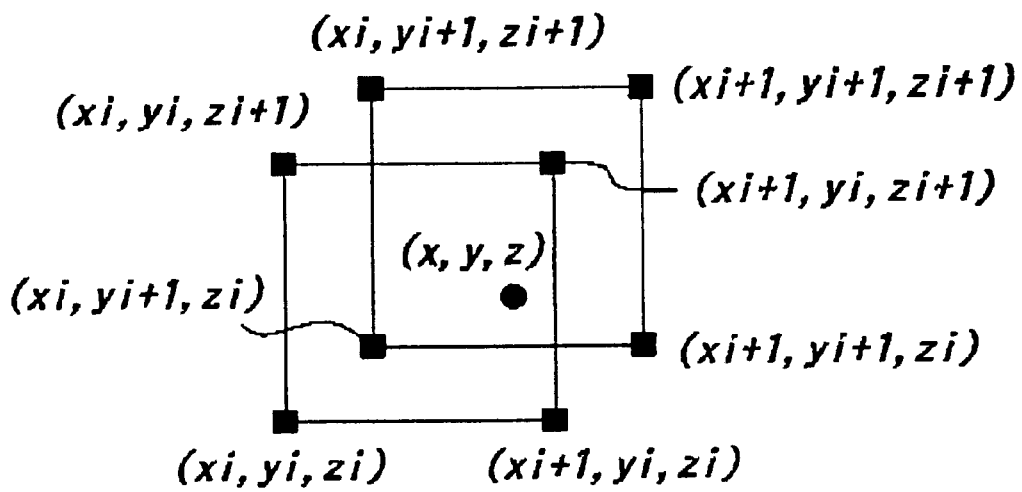
FIG. 9 is an explanatory view showing coordinate setting in linear interpolation which can be used in the method of the example.

As shown in FIG. 9, attention will be focused on eight measuring points in the vicinity of the point $(x, y, z)$, which have space errors obtained by the sequential two-point method.

Figure 10:
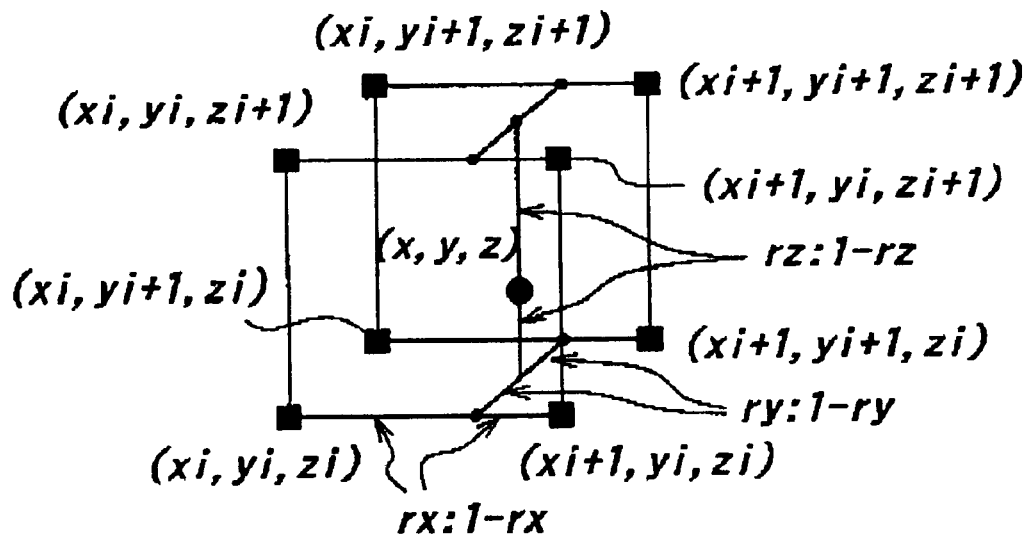
FIG. 10 is a schematic view showing an interpolation method in the linear interpolation.

When the equations of:

$$r_x = \frac{(x - x_i)}{(x_{i+1} - x_i)}, \quad r_y = \frac{(y - y_i)}{(y_{i+1} - y_i)}, \quad r_z = \frac{(z - z_i)}{(z_{i+1} - z_i)}$$

are set, as apparent from a schematic view of linear interpolation shown in FIG. 10, the space error $e_z(x, y, z)$ is obtained by the following equation:

$$\begin{aligned}e_x(x,y,z) = &(1-r_x)(1-r_y)(1-r_z) \cdot e_x(i,i,i) + r_x(1-r_y)(1-r_z) \cdot \\ & e_x(i+1,i,i) + (1-r_x)r_y(1-r_z) \cdot e_x(i,i+1,i) + \\ & r_x r_y(1-r_z) \cdot e_z(i+1,i+1,i) + (1-r_x)(1-r_y)r_z \cdot \\ & e_z(i,i,i+1) + r_x(1-r_y)r_z \cdot e_z(i+1,i,i+1) + \\ & (1-r_x)r_y r_z \cdot e_z(i,i+1,i+1) + r_x r_y r_z \cdot \\ & e_z(i+1,i+1,i+1)\end{aligned}$$

As characteristics of the above method, the following points are enumerated.

Calculation is simple

The space error $e_z(x, y, z)$ is continuous on boundary lines (sides of the cube of FIG. 10), and the derivative of $e_z(x, y, z)$ is discontinuous.

The eight measuring points must be vertexes of a cuboid.

(2) Higher-Order Interpolation

As a progressed form of the linear interpolation of (1), higher-order interpolation is conceivably performed in order to improve interpolation accuracy and to realize smoothness. The higher-order interpolation corresponds to B-spline surface fitting.

The B-spline surface and the like is fitted to a surface in which z is constant. Applicable techniques are: a technique of calculating a correction quantity at the point $(x, y, z)$ by performing the linear interpolation with respect to a correction quantity of a space obtained on two surfaces by which the point is sandwiched; and a technique of applying b-spline interpolation successively to the three axial directions of the x, y and z axes.

As characteristics of the above method, the following points are enumerated.

The space error $e_z(x, y, z)$ is continuous on boundary lines (sides of the cube of FIG. 10), and the derivative and second derivative of $e_z(x, y, z)$ are also continuous.

A number of measuring points are necessary (measuring points of 4×4×4 are necessary in the case of cubic fitting).

Validity of an obtained solution is indefinite.

(3) Least Square Method

Assuming that the space error $e_z(x, y, z)$ conforms to a certain model, fitting thereof to the model is carried out.

Here, a linear model relative to x, y and z is conceived as the simplest model. Specifically, it is assumed that the following equation can be set.

$$e_z = ax + by + cz + d$$

Then, the least square method is applied. A measuring point where a space error is obtained by the sequential two-point method is set to $(x_i, y_i, z_i)$, and a measured value of the space error at the measuring point $(x_i, y_i, z_i)$ is set to $e_{zi}$ (i=1 ..., m). Thus, the following relational expression is established between the measured value of the space error and unknown parameters (a, b, c, d).

$$\begin{bmatrix} e_{z1} \\ \vdots \\ e_{zm} \end{bmatrix} = \begin{bmatrix} x_1 & y_1 & z_1 & 1 \\ & \vdots & & \\ x_m & y_m & z_m & 1 \end{bmatrix} \begin{bmatrix} a \\ b \\ c \\ d \end{bmatrix}$$

The foregoing expression is substituted by the equation of:

$$y = Ax$$

It is assumed that uncertainty of each component $e_{zi}$ of y is a value which is unknown and identical to others and that there is no correlation between the components thereof. Dispersion of the uncertainty is set as $\sigma^2$.

In this event, a least square solution is given by the following equation:

$$\hat{x} = (A^T A)^{-1} A^T y$$

Calculation of the above equation results in the following formula:

$$\hat{x} = \begin{bmatrix} \hat{a} \\ \hat{b} \\ \hat{c} \\ \hat{d} \end{bmatrix} = \begin{bmatrix} \sum x_i^2 & \sum x_i y_i & \sum x_i z_i & \sum x_i \\ \sum x_i y_i & \sum y_i^2 & \sum y_i z_i & \sum y_i \\ \sum x_i z_i & \sum y_i z_i & \sum z_i^2 & \sum z_i \\ \sum x_i & \sum y_i & \sum z_i & m \end{bmatrix}^{-1} \begin{bmatrix} \sum x_i e_{zi} \\ \sum y_i e_{zi} \\ \sum z_i e_{zi} \\ \sum e_{zi} \end{bmatrix}$$

An estimated value of $\sigma^2$ is given by the equation as follows:

$$\hat{\sigma}^2 = \frac{1}{m-4} |y - A\hat{x}|^2 = \frac{1}{m-4} \sum \{e_{zi} - (\hat{a}x_i + \hat{b}y_i + \hat{c}z_i + \hat{d})\}^2$$

By use of this estimated value, a covaliance matrix Cx of the uncertainty of the foregoing least square solution is calculated by the following equation:

$$C_x = \hat{\sigma}^2 (A^T A)^{-1}$$

The space error at the point (x, y, z) and the uncertainty thereof are calculated by the following equations:

$$\hat{e}_z(x,y,z) = \hat{a}x + \hat{b}y + \hat{c}z + \hat{d}$$

$$\hat{\sigma}_{ez}^2 = [x\ y\ z\ 1] C_x [x\ y\ z\ 1]^T$$

As characteristics of the above-described method, the following points are enumerated:

The space error $e_z(x, y, z)$ is discontinuous on boundary lines (sides of the cube in the above drawing), (Thus, there is a possibility that the method is unusable when continuity of path is demanded such as in development into a machine tool.)

There is no limitation on disposition and the number of measuring points. (Substantially, eight points in the vicinity of the point (x, y, z) are appropriate similarly to (1).)

A solution to be obtained is high in validity. (Note that it is premised on that the model is appropriate.)

Estimation of uncertainty of the space error and examination of validity of fitting are possible.

Examination of appropriateness of the model is necessary.

Conceivably, it depends on characteristics, applications and the like of the three-dimensional coordinate measuring device to be a subject that which one of the above three methods is suitable. In general, it is conceived to be practical that either of the following two methods is used: the bilinear interpolation in which the calculation is simple and continuous; and the least square method capable of estimating the uncertainty of the space error and of evaluating the validity of fitting even though discontinuity occurs.

A method of verifying whether or not applications of the above described error correction techniques are appropriately possible in a given environment will be proposed below.

Fitting is performed by using every second point of the measuring points where an error has been obtained by the sequential two-point method. Then, an error at the remaining measuring points is calculated. The error obtained by the calculation and the error obtained by the sequential two-point method are compared with each other. If the two values are close enough, the error correction technique can be regarded to be appropriate. Also at the same time, based on a difference between the two values at the time, it is conceived to be possible to estimate the magnitude of an error of a value after corrected by the error correction technique.

Furthermore, an example of a method of fusing redundant data measured in measuring the space error by use of the sequential two-point method will be proposed hereinbelow.

Figure 11A:
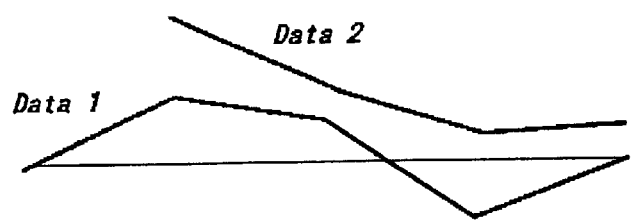
FIGS. 11(a) to 11(d) are explanatory views showing a fusion method of redundant data which can be used in the method of the example.
Figure 11B:

According to the method, as shown in FIGS. 11(a) to 11(d), two kinds of data such as data 1 and data 2 for example, shown in FIG. 11(a) are fused. First, as shown in FIG. 11(b), the data 2 of the data 1 and 2 having mutually redundant parts therein is entirely subjected to offset correction (average values of the redundant parts are obtained in the respective data 1 and 2, and a difference between the average values is set to be an offset).

Figure 11C:

Subsequently, as shown in FIG. 11(c), average values are obtained at respective points of the mutually redundant parts of the data 1 and 2, and the obtained average values are set as new measured values.

Figure 11D:
Figure 12:
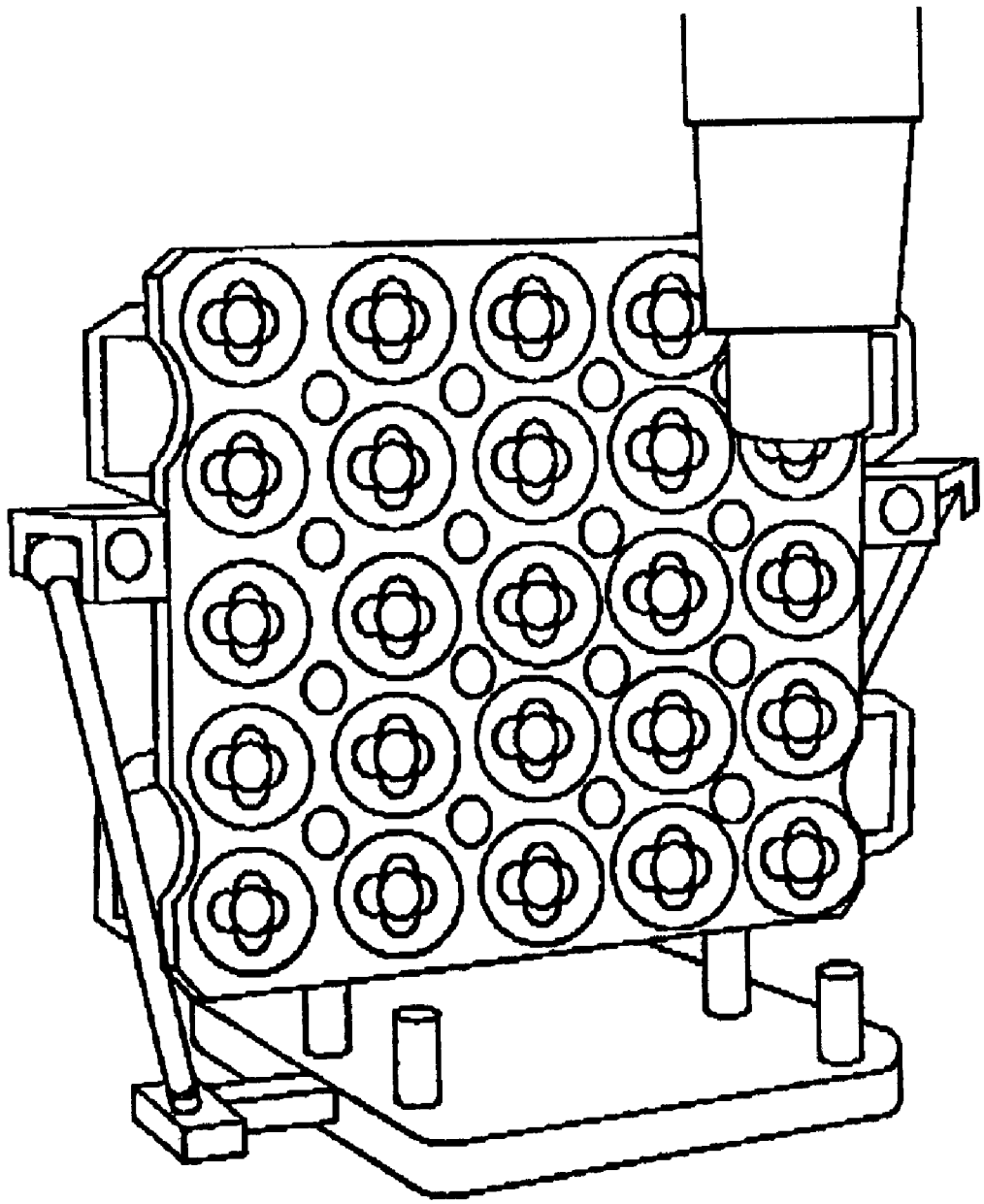
FIG. 12 is a perspective view showing a ball plate used in a conventional error measuring method.
Figure 13:
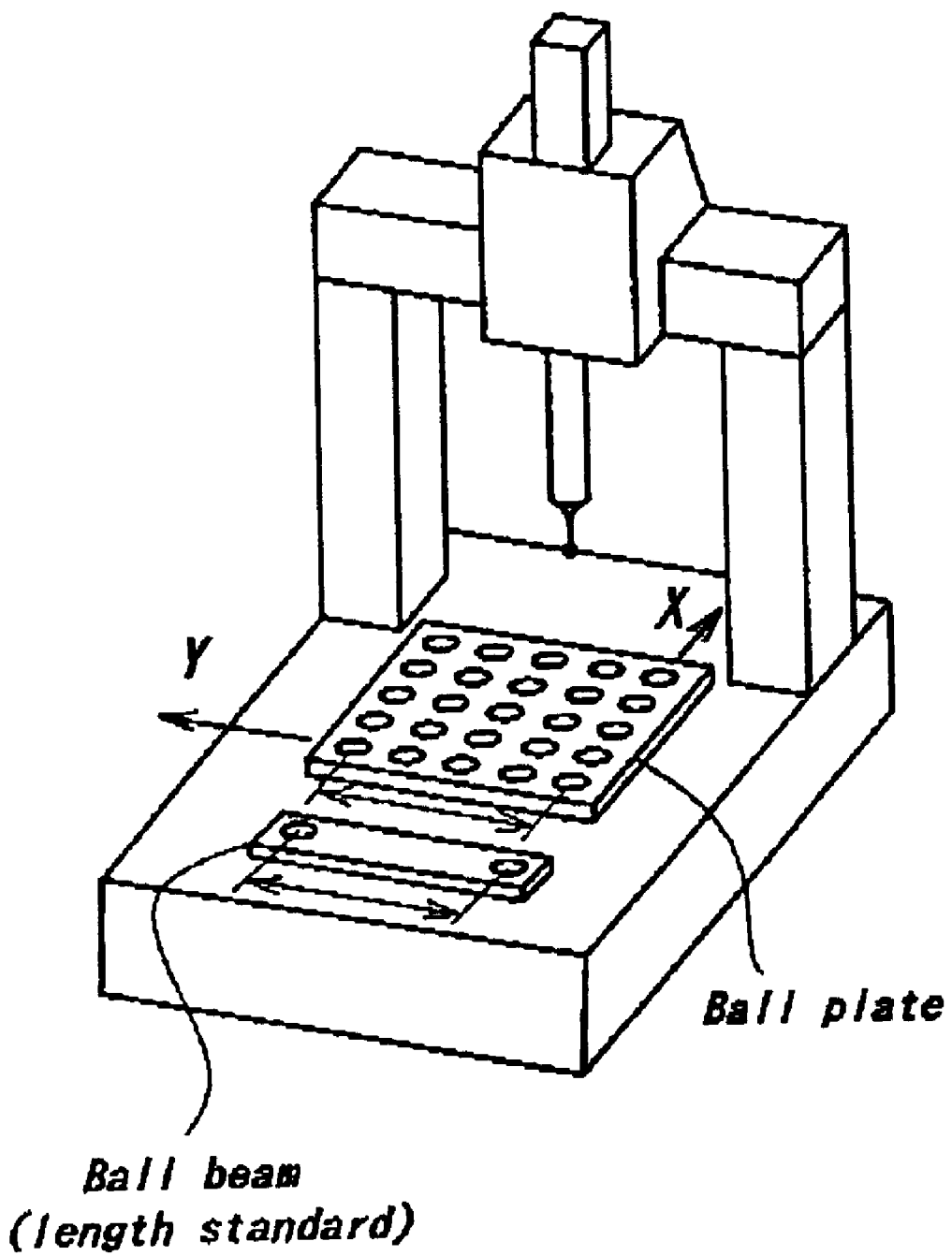
FIG. 13 is an explanatory view showing the error measuring method by use of the ball plate.
Figure 14A:
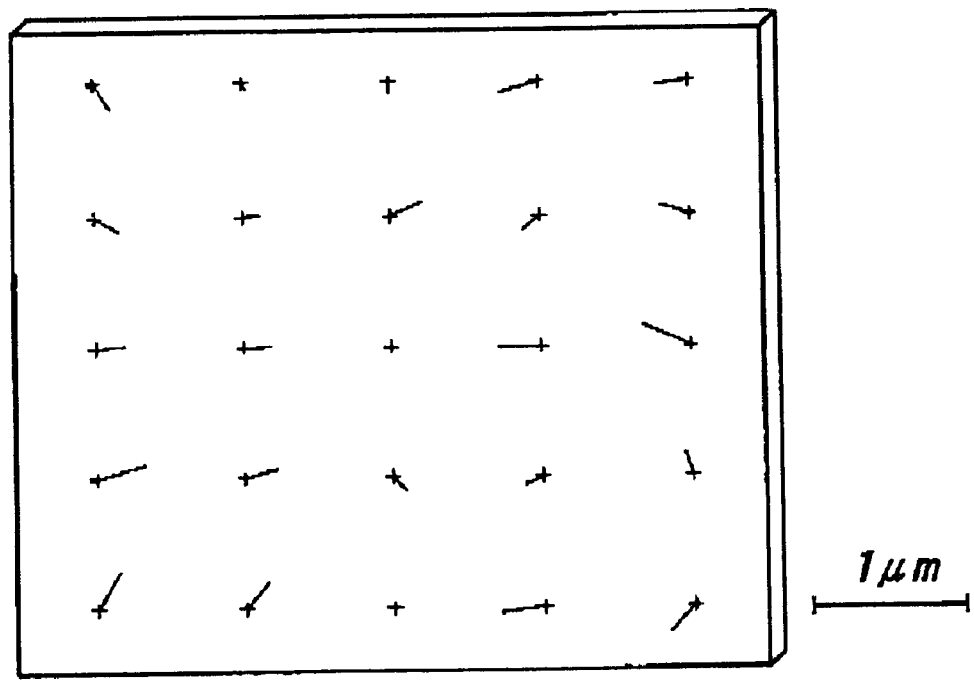
FIGS. 14(a) and 14(b) are explanatory views showing results of the error measurement by use of the ball plate.
Figure 14B:
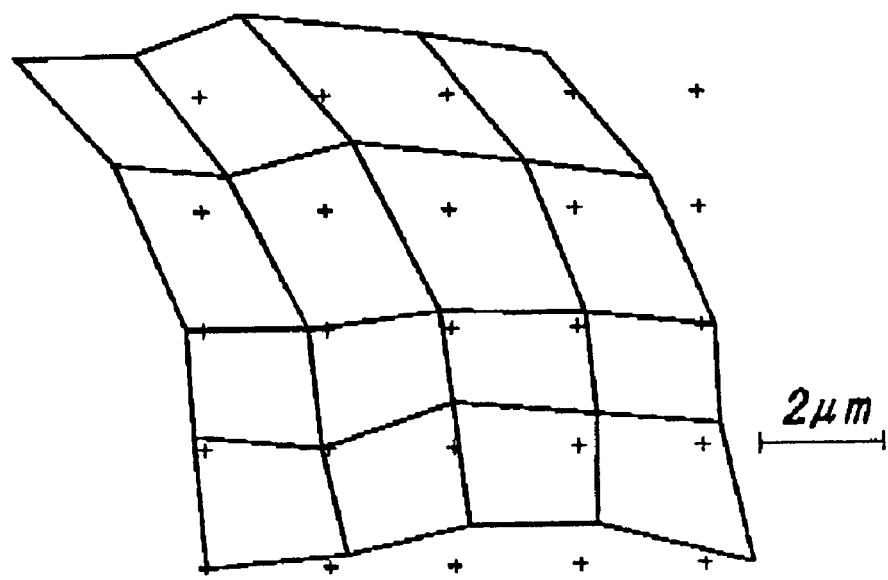
Figure 15:
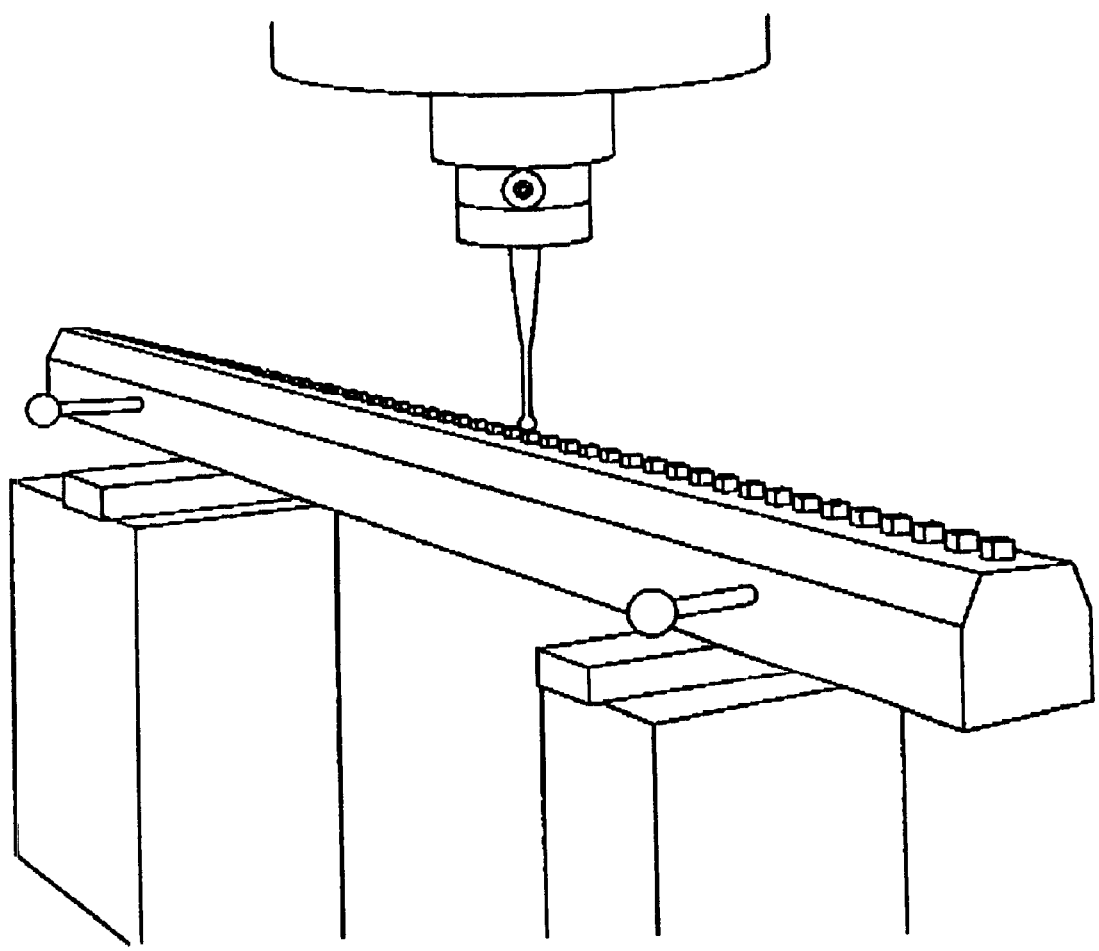
FIG. 15 is an explanatory view showing a conventional error measuring method by use of a step gauge.
Figure 16:
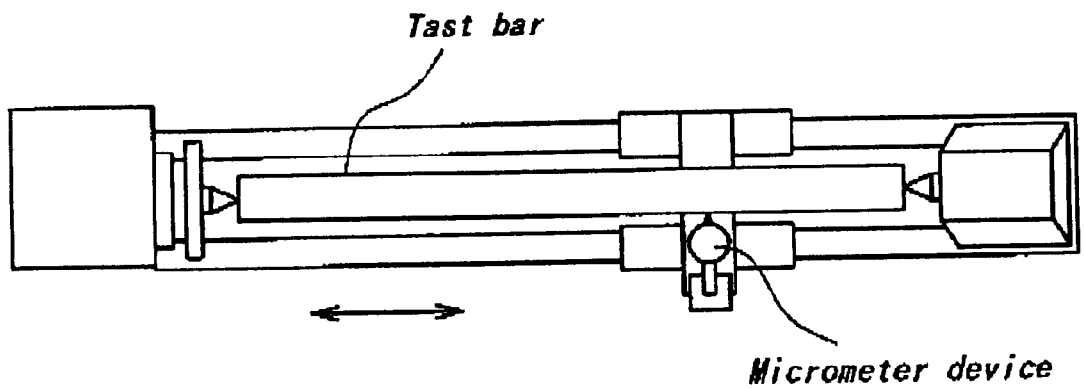
FIG. 16 is an explanatory view showing a conventional error measuring method by use of a test bar.
Figure 17:
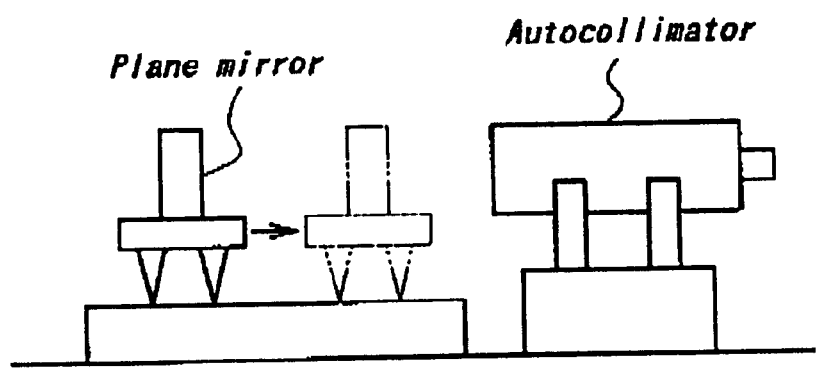
FIG. 17 is an explanatory view showing a conventional error measuring method by use of an autocollimator.
Figure 18A:
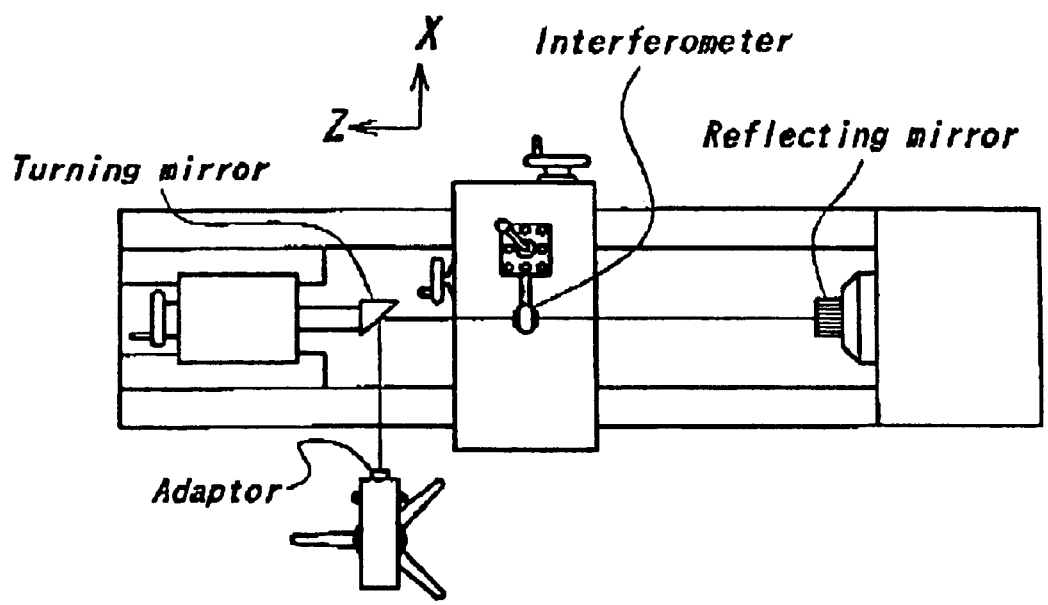
FIG. 18(a) is an explanatory view showing a conventional error measuring method by use of a laser.
Figure 18B:
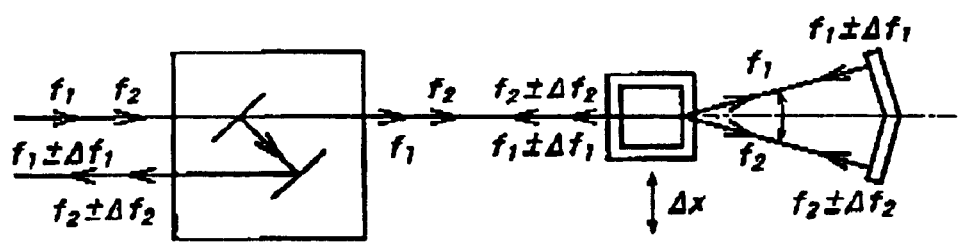
FIG. 18(b) is a constitutional view of an optical path.
Figure 19A:
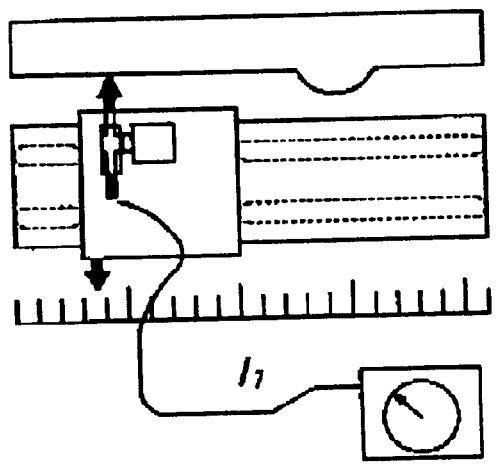
FIGS. 19(a) to 19(d) are explanatory views showing a conventional error measuring method by a reverse method.
Figure 19B:
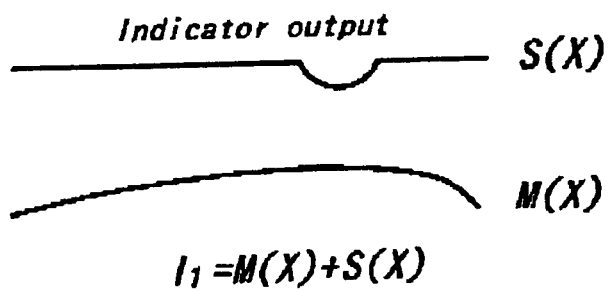
Figure 19C:
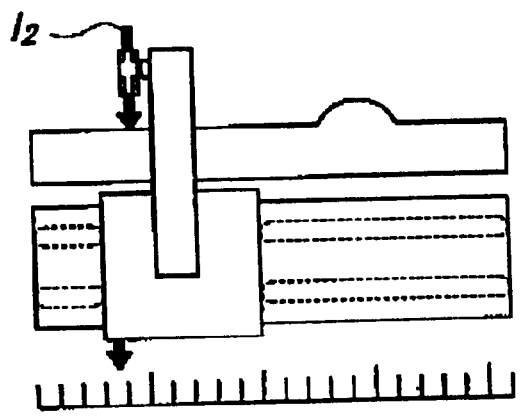
Figure 19D:
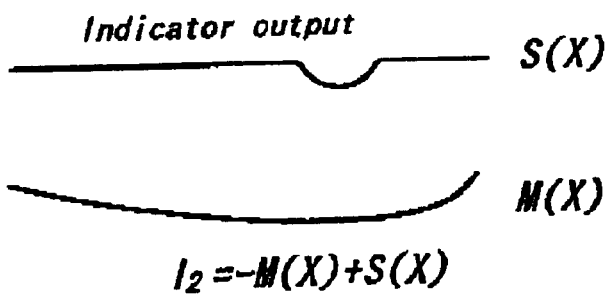

Then, as shown in FIG. 11(d), zero-point correction is performed as necessity arises.

The above-described fusion method can be used in fusion and the like of, for example, measurement results in the x axis direction and y axis direction, of measurement results in positive and negative directions, and of a plurality of measurement results obtained by an identical technique.

However, as a premise, it is necessary that absolute values of the respective data groups have no meaning, but only relative measured values have meanings, and that there is no correlation between the measured values in the data groups if the offsets (deviations) are removed, that is, white errors.

Note that, desirably, fusion of the data is performed before various data corrections such as zero-point alignment.

As already described it is enumerated as the characteristics of the method of the present invention that the reevaluation of the error space corresponding to variations of the measuring device with the passage of time and the like is easily performed because of the simple device to be used and the easy processing.

As the object to be measured for the error space calculation, in the method of the present invention, it is absolutely unnecessary to use such a high-accuracy object as the ball plate, and the use of an aluminum plate available commercially in general is sufficient.

INDUSTRIAL APPLICABILITY

As described above, the present invention is capable of offering advantages to technical fields such as: a technology of measuring shapes of processed parts such as machine parts; an information processing technology wherein the invention enabling improvement in the measuring performance by expressing the error space with a matrix and by constructing the relational expression of the correction based on the expressed error space; a production and processing technology wherein the invention enabling manufacture of highly accurate machine parts which satisfies improved accuracy along with the accuracy improvement; and a production and processing technology wherein the invention being applicable to tool movement of the machine tool.

What is claimed is:

1. A position error evaluating method of a moving device, comprising the steps of:

in a moving device which moves a movable body in two axial directions or in three axial directions orthogonal to each other, obtaining by a sequential two-point method a straightness error curve indicating a state of change in a position error of said movable body along a uniaxial direction out of predetermined two axial directions among said biaxial or three axial directions, being repeated for the other urtiaxial direction out of said two axial directions, said position error being related to a direction orthogonal to said predetermined two axial directions;

obtaining straightness error curves indicating a state of change in a position error of the movable body along said other uniaxial direction based on coordinate positions of both ends of a group of already obtained said straightness error curves, said position error being related to the direction orthogonal to said predetermined two axial directions, and setting the straightness error curves at the coordinate positions of the both ends as boundary straightness error curves;

obtaining an error surface by correcting alignment of said group of straightness error curves based on said boundary straightness error curves; and evaluating a two-dimensional position error of said movable body on a planar surface including said predetermined two axes in accordance with said error surface, said two-dimensional position error being related to a direction orthogonal to the planar surface.

2. The position error evaluating method of a moving device according to claim 1, further comprising the steps of:

obtaining an error space; and evaluating a three-dimensional position error of said movable body in a space within predetermined coordinate ranges according to said error space.

3. The position error evaluating method of a moving device, according to claim 2, further comprising the steps of:

maintaining data indicating said error space in a control device for controlling an operation of said moving device; and correcting a position of said movable body moved by said moving device by use of a relational expression of correction for compensating for an error in the error space data.

4. The method of improving three-dimensional position accuracy of a moving device according to claim 3, further comprising the steps of:

previously obtaining said error space data according to a change of environment surrounding said moving device; and upon using said moving device, correcting a position of said movable body moved by said moving device by using the relational expression of correction for compensating for the error in said error space data corresponding to environment surrounding said moving device in use.

5. The position error evaluating method of a moving device according to claim 2, wherein at an intermediate point of points where the position error has been obtained by said sequential two-point method, a position error is obtained by one-dimensional or multidimensional interpolation.

6. The position error evaluating method of a moving device according to claim 1, wherein at an intermediate point of points where the position error has been obtained by said sequential two-paint method, the position error is obtained by one-dimensional or multidimensional interpolation.

7. The position error evaluating method of a moving device according to claim 3, further comprising the steps of:

obtaining an error space;

evaluating a three-dimensional position error of said movable body in a space within predetermined coordinate ranges according to said error space;

maintaining data indicating said error space in a control device for controlling an operation of said moving device; and correcting a position of said movable body moved by said moving device by use of a relational expression of correction for compensating for an error in the error space data.

* * * * *